Nov. 18, 1952      C. J. FECHHEIMER      2,618,756

LIQUID COOLED ELECTRICAL MACHINE

Filed June 6, 1949      2 SHEETS—SHEET 1

INVENTOR
CARL J. FECHHEIMER
BY Miles Henninger
ATTORNEY

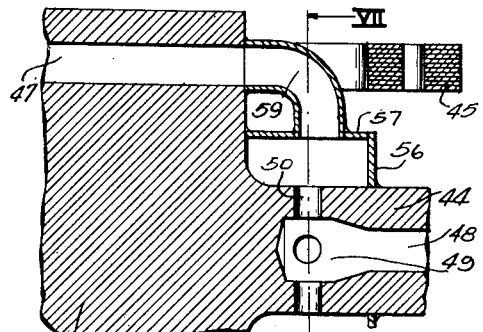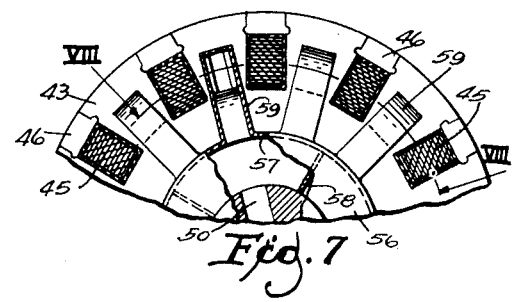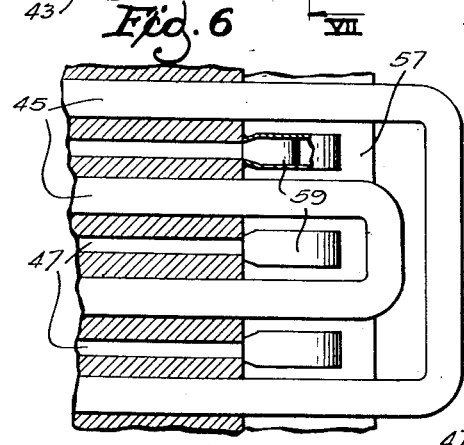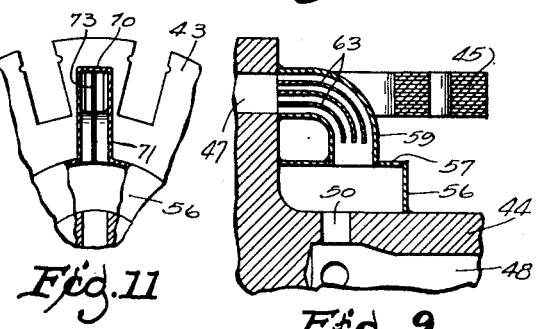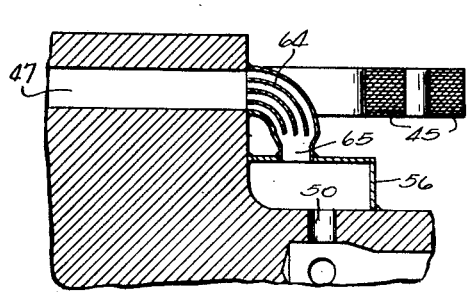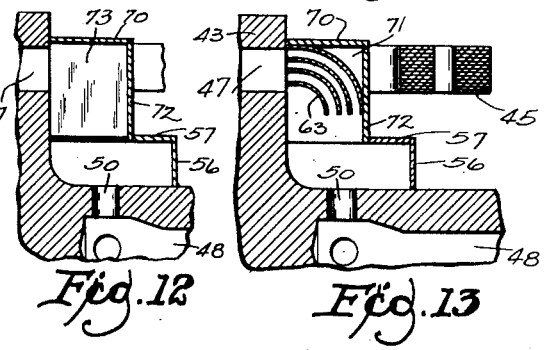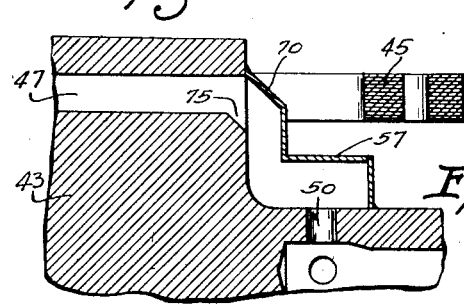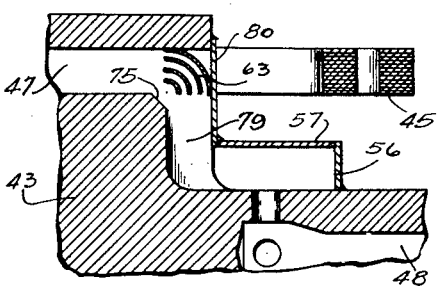

Patented Nov. 18, 1952

2,618,756

UNITED STATES PATENT OFFICE 2,618,756

LIQUID COOLED ELECTRICAL MACHINE

Carl J. Fechheimer, Milwaukee, Wis.

Application June 6, 1949, Serial No. 97,382

8 Claims. (Cl. 310—54)

This invention relates to improvements in dynamoelectric machines, such as generators and motors and particularly to such machine in which either the stator or the rotor, or both, are cooled by the flow of a liquid or liquids therethrough.

Electric rotating machines, such as generators, which are driven at high speeds by a prime mover, such as a steam or gas turbine, are being constantly increased in size as the size of the prime movers increase. As the length and diameter of such electric machines increase, the problem of dissipating heat becomes increasingly more difficult to solve. The presently used gaseous cooling media are greatly inferior to liquid cooling because of the low heat absorption and heat transfer properties of gases as compared to liquids. For example, water has a heat absorption value approximately 3600 times that of hydrogen at one atmosphere. In long rotors, the temperature of the gaseous cooling medium therefore becomes so high, before discharge of the gas from the rotor ducts, that the gas is completely ineffective for cooling adjacent the discharge ends of such ducts. The heat transfer rate of water is approximately 400 times that of hydrogen and, accordingly, for a given velocity of cooling medium flow, the heat is removed from surfaces in contact with water at a much more rapid rate than by the use of hydrogen.

Herein the term "heat absorption" is employed to define the heat units which may be absorbed by a unit volume of coolant per degree rise in temperature thereof. By "heat transfer" is meant the heat units per second abstracted from a hot surface per surface unit area per degree difference in temperature thereof.

The higher heat absorption and rate of heat transfer by water as compared to hydrogen allows the use of much smaller quantities of water at a much lower velocity and with increased cooling effect as compared to hydrogen. Hence, an electrical generator may be operated at a higher rate of heat generation for a given copper temperature. The ampere turns may therefore be increased and the kv.-a. rating for a given size of machine may be considerably increased, or the dimensions of the machine may be appreciably reduced for a given kv.-a. rating.

One consequence of the high heat absorption in liquid cooling as compared to gas cooling of an electric generator is that the temperature of the liquid coolant upon discharge thereof is but little higher than upon entrance, so that the temperature of the copper is kept nearly the same throughout the imbedded length of the windings. Nearly uniform temperature, radially in the copper in the rotor, is not obtainable near the middle of a long rotor with hydrogen or air as the coolant, because the heated gas is no longer effective for cooling and most of the generated heat must be conducted to the external rotor surface whence it escapes to the cooling gas. Consequently, near the middle of a long gas cooled rotor there is a large radial temperature drop in the teeth and the copper. With a relatively cool liquid throughout the axial length of the rotor, there is no large radial temperature drop and a more nearly uniform radial temperature is obtained. Greater uniformity of copper temperature is also obtained in a generator stator by use of liquid cooling as compared to gaseous cooling but the difference between the liquid and gas cooling is not so marked as in the case of the rotor.

In a prior attempt at liquid cooling of the rotor of a turbine driven electric generator, it was found that the rotor temperatures were not materially reduced because of failure to obtain a sufficiently high water velocity in the axial passages and because of failure to provide passages in the rotor teeth. Further, trouble was experienced because of entrapment of air in the passages, which caused unbalance of the rotor.

It is, therefore, one object of the present invention to provide a dynamoelectric machine with conduits so placed in the stator as to provide for the circulation of a cooling liquid adjacent the windings in the stator and throughout the stator laminations.

Another object of the invention is to provide the stator of a rotating electric machine with conduits so distributed throughout the stator laminations as to permit the abstraction of heat both from the stator windings and from the laminations at a large number of locations both axially and radially of the stator.

A further object of the invention is to provide the stator of a dynamoelectric machine with cooling liquid conduits in spaces between packs of laminations, the conduits and the lamination packs being so arranged and proportioned that the heat generated in the stator tooth zone and back of such teeth, can be removed at a rate to secure nearly uniform and only a limited temperature rise in the tooth zone and in the core back of such zone.

A further object of the invention is to provide the stator of a dynamoelectric machine with conduits for the flow of a cooling liquid therethrough, the conduits also providing mechanical support resisting the axial pressure required on the stator laminations to secure a tight core.

Another object of the invention is to provide a dynamoelectric machine with cooling liquid conduits spirally arranged between the packs of stator laminations in the core portion back of the teeth so as to remove any desired quantity of heat from the stator and to provide adequate support for the laminations in the axial direction of the stator.

A further object of the invention is to provide the tooth portions of the stator of a dynamoelectric machine with conduits for conveying cooling liquid therethrough, the conduits being so arranged that the ingoing and outgoing liquid paths defined thereby extend in a direction generally radially of the stator.

Another object of the invention is to provide a dynamoelectric machine with conduits carrying a liquid and so arranged that adjacent portions of a limited number of the conduits in the tooth zone are hydraulically in series, and groups of conduits in the same relation axially, are hydraulically in parallel.

A further object of the invention is to provide the stator of a dynamoelectric machine with conduits for the flow of cooling liquid therethrough, the conduits being so related to the stator laminations and stator windings as to minimize the degree of change required in the present stator structure as compared to the prior construction of such stators.

Another object of the invention is to provide a rotor for a dynamoelectric machine with ducts and passageways therethrough so constructed as to cause the flow of the liquid therethrough substantially as the result of rotor movement and with a minimum of pressure applied to such liquid externally of the rotor.

A further object of the invention is to provide a rotor for dynamoelectric machines with ducts and passages having portions thereof adjacent the rotor windings and in which a cooling liquid flows around the various bends in such ducts and passages without producing such whirls and eddies in the liquid flow as might otherwise seriously hinder such flow.

Objects and advantages other than those above set forth will be apparent from the following description when read in connection with the accompanying drawing in which:

Fig. 6 is a fragment of an electric generator rotor showing one manner of constructing the passages therethrough.

Fig. 7 is a view partially in cross-section, on the plane of line VII—VII of Fig. 6 and partially in end elevation.

Fig. 8 is a developed view on the plane of curved line VIII—VIII of Fig. 7.

Fig. 9 is a view similar to Fig. 6 with vanes in one of the ducts for facilitating the flow of liquid through such ducts.

Fig. 10 is a view similar to Fig. 9, of a modified form of duct.

Fig. 11 is a view similar to a portion of Fig. 7 to show the manner of applying a partition in the connecting ducts between the rotor radial passages and the passages through the rotor in or adjacent the teeth thereof.

Fig. 12 is a view similar to a portion of Fig. 6 to show the duct partition of Fig. 11, in elevation.

Fig. 13 is a view similar to Fig. 12, of another modified form of duct construction for connecting the passages through the rotor.

Fig. 14 is a view similar to Fig. 6 but showing a simplified duct construction; and Fig. 15 is a view showing one way in which a portion of the connecting ducts may be formed in the body of the rotor itself.

Figure 1:
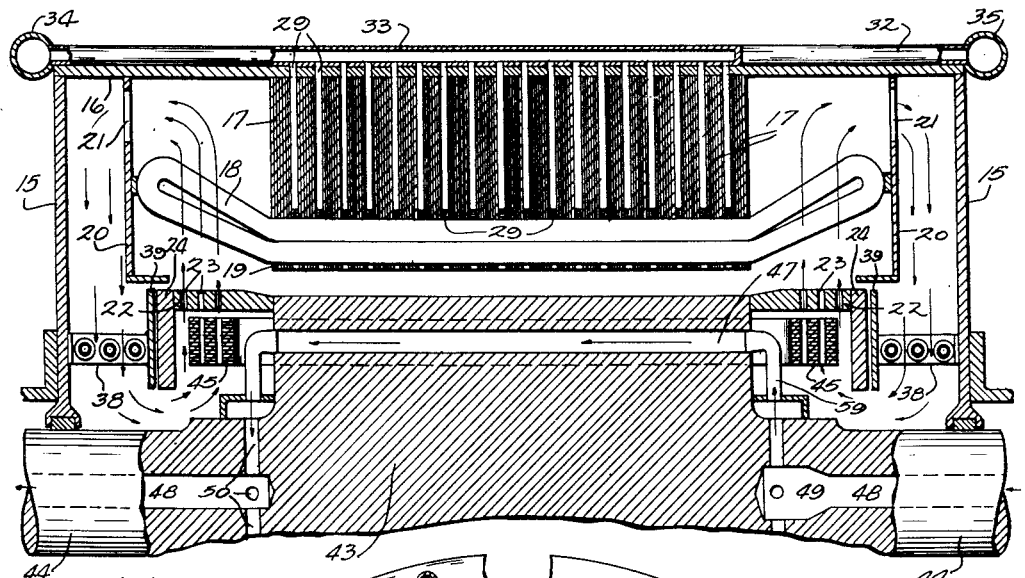
Fig. 1 is a vertical cross-sectional view on substantially a central plane through a portion of an electric generator embodying the present invention.

Generally, the present invention provides a stator for dynamoelectric machines in which the laminations are divided into a plurality of packs fixed on a frame in such relation axially of the frame as to define a plurality of spaces extending radially of the machine. Mechanically the packs and spaces therebetween somewhat resemble the vent duct construction now used extensively with radial ventilation of such machines. A plurality of square or rectangular cross-section conduits are placed in the several spaces between the lamination packs to extend from the outer periphery of the stator core to adjacent to the backs of the first of a group of teeth. The conduits are then extended along and about a number of teeth and hydraulically in series and are finally brought back to the outer periphery of the stator core. The conduits are so distributed as to be in contact for substantially their whole lengths with the end laminations of individual packs of stator laminations. Each space receives one of a group of conduits with the ends brought exteriorly of the stator laminations, where the ends may be severally joined hydraulically in parallel by connection with manifolds extending axially and externally of the stator core. The manifolds are arranged in pairs, i. e., one manifold per group of conduits being connected with a liquid delivery header, and one manifold being connected with a liquid discharge header, the headers being severally adjacent the ends of the machine. Such headers are preferably interconnected by way of a heat exchanger and pump for closed circuit circulation of the cooling liquid through the headers, the manifolds and the conduits.

The rotor is preferably an integral member with a body portion slotted to receive windings, and shaft portions extending from the body portion ends. The rotor body is provided with passages adjacent the slots for the windings therein, and the rotor shafts are severally provided with a co-axial longitudinal passage and generally radial passages from the co-axial passages to adjacent the ends of the rotor body. An annular casing is fixed on the shafts adjacent the ends of the rotor body and over the radial shaft passages. The casing is partitioned so that the liquid is prevented from moving therein circumferentially with respect to the rotor. Such casing compartments are connected with a group of rotor body passages by connecting ducts which are bent or otherwise shaped for individually providing paths for the flow of cooling liquid from the casing to the several rotor body passages and vice versa. Curved vanes may be placed in the connecting ducts to divide the cross-sectional areas therethrough into a plurality of curved paths thus avoiding substantially all restrictions in flow otherwise arising from whirls due to unequal tangential inertia forces, or Coriolis' forces, acting on the liquid passing through the connecting ducts between the rotor radial passages and the rotor body axial passages.

Referring particularly to the drawings in which like reference numerals are applied to like parts, numeral 15 designates the end members and 16 designates the cylindrical member of a frame and housing for a dynamoelectric machine such as a generator. The stator of the machine comprises a plurality of groups or packs of magnetic sheet metal laminations 17 mounted in the frame by suitable means and severally in axially spaced relation with one another. The laminations form a hollow cylinder or core as is usual, which is provided adjacent to the inner periphery thereof with slots for receiving windings 18 to be fixed in the slots by keys or wedges 19 as is also usual. Interior walls 20 with apertures 21 define a portion of the path for flow of a gaseous cooling medium within the machine frame or housing. Other portions of the gas flow path are defined by the retaining rings 22 for supporting the ends of the rotor windings and have apertures 23 therethrough. Joining the retaining ring 22 is a disk 24.

A baffle plate 39 is shown as mounted on the heat exchangers 38 for the purpose of minimizing any back pressure effect which might arise from centrifugal force of the gases in contact with the rotating disk 24. Without the use of baffle 39, the flow of the gases would be impeded by a whirl.

Figures 2, 3:
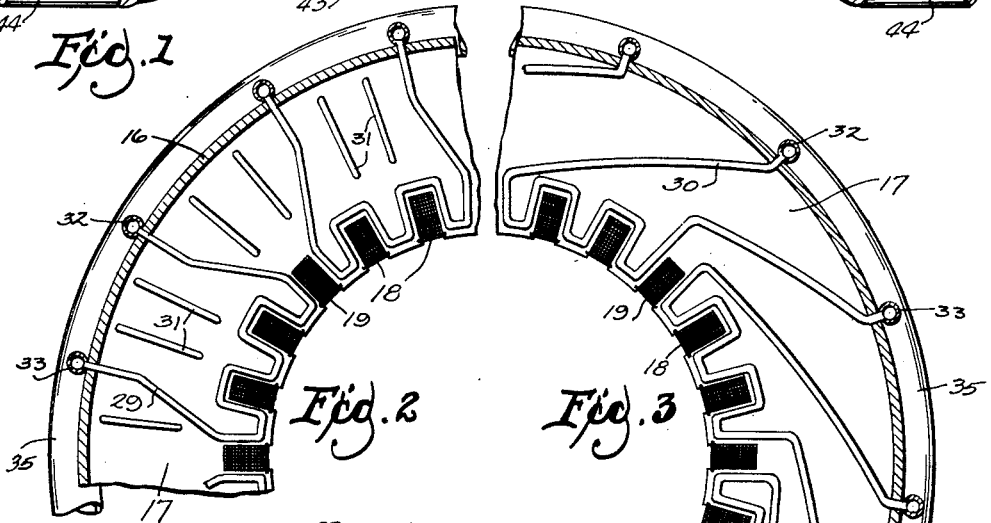
Fig. 2 is a fragmentary transverse cross-section through the stator of the machine.
Fig. 3 is a view similar to Fig. 2 but showing a different manner of cooling duct distribution in the stator.
Figures 4, 5:
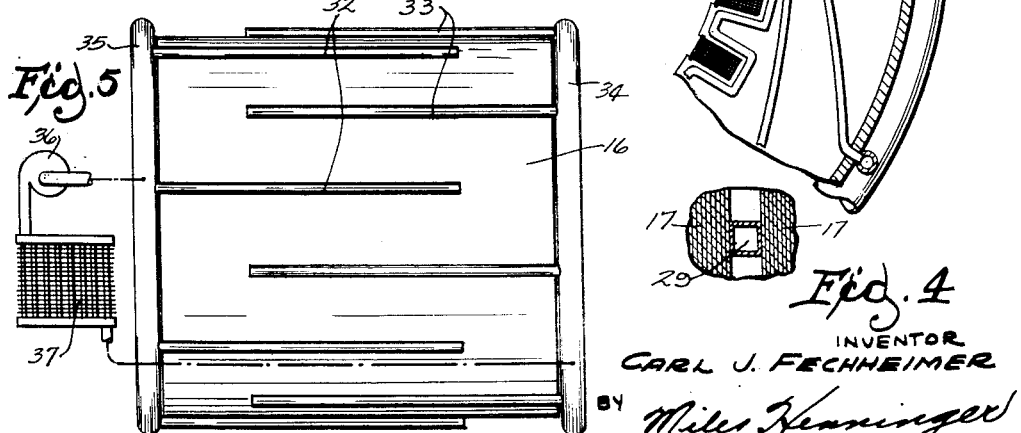
Fig. 4 is a fragmentary view of a portion of adjacent stator laminations groups or packs with one of the cooling liquid conduits in cross-section.
Fig. 5 is a somewhat diagrammatic side elevation of a generator embodying the present invention and showing an arrangement of manifolds and headers externally of the machine, with an indication of a closed circuit for the flow of the cooling liquid therethrough.

The spaces between the lamination packs 17 (see especially Figs. 1, 2, 3 and 4) are partially occupied and divided by conduits as indicated at 29 and 30 in Figs. 2 and 3. Such conduits are square (or rectangular), in cross-section as shown in Fig. 4 and perform the multiple functions of spacing the lamination packs and of providing paths for the circulation of a cooling liquid. When the conduits are shaped as at 29 in Fig. 2, it may also be desirable to provide the lamination packs with additional spacers 31, to aid in supporting the packs in spaced relation with one another. However, when the conduits are spiraled as at 30 in Fig. 3, the additional radial supports 31 may usually be omitted. In either case the ends of each of the conduits are severally connected with manifolds 32 or 33 which are themselves severally connected at one of their ends with one or the other ring-shaped headers 34 or 35. Cooling liquid is withdrawn from the header 35 (see Fig. 5) by a suitable pump 36 and is supplied to the header 34 through a heat exchanger 37.

The generated heat density is greatest in the tooth-slot zone. With deep radial slots, it is important that the paths along which the generated heat is transmitted to the cooling liquid, be favorably located. Such location is accomplished by extending the conduits 29, 30 inward and outward about a given tooth in close proximity to the outside of the insulation on the coils in the slots. With the lower generated heat density in the core back of the tooth-slot zone, the conduits may be spaced considerable distances apart as shown in Figs. 2 and 3. Generally, ample contact areas, internal wetted areas and adequate cross-sectional areas are provided between the end laminations of adjacent packs and the conduits with the use of square conduits. But it will be understood that such areas can be increased by the use of conduits of rectangular section. If the stator is operated in a thermally favorable gas atmosphere such as hydrogen or helium (of which the thermal conductivities are relatively high as compared to air), such gas supplants the air particles between consecutive laminations thereby increasing the transverse thermal conductivity of the packs of laminations. The choice of pack thickness, conduit sections, conduit length and conduit spacing, and of liquid velocity in the conduits, can be determined by the designer by simple calculations.

Heat exchangers 38 are located within the housing 15, 16 and may also be connected hydraulically in parallel with the main cooling liquid circuit above described, with suitable control valves, to abstract heat from the gaseous medium circulating through the stator and rotor winding ends in the paths defined by the walls 20 and retaining rings 22, and passing through the respective apertures 21 and 23 therein. The ends of the stator and rotor windings are thus cooled, the structure shown in Patent 1,927,890 issued to me on September 26, 1933 being especially useful in such rotor winding ends cooling.

The rotor of the machine comprises an integral member with a body portion 43 and end or shaft portions 44, the body portion being slotted to receive windings 45 secured in such slots by wedges 46 (see Fig. 7). Between adjacent slots, the body 43 of the rotor has passages 47 formed axially therein, the passages extending from end to end of the rotor body and between the winding slots therein. The rotor end or shaft portions 44 are formed with passages 48 therethrough coaxially with such shaft portions and from the free ends thereof to adjacent the ends of the rotor body. The passage 48 for inlet of cooling liquid to the rotor, may be enlarged adjacent the end of the rotor body to provide a chamber 49. Passages 50 extend radially to the external surfaces of the rotor shafts from the passages 48 therein.

A plate 56 is fixed on each rotor shaft portion 44 to extend therefrom as a flange at such spacing from the rotor body ends as to include the ends of the passage 50. Cylinder 57 is fixed to the periphery of the plate 56 and on the ends of the rotor body 43 to co-act with the plate 56 in defining a substantially cylindrical casing into which all of the passages 50 discharge. Such casing is preferably divided into compartments by partitions 58 which prevent circumferential liquid flow with respect to the rotor, in the casing. The cylinder 57 is formed with a plurality of openings to which connecting ducts 59 are secured at one of the ends thereof, the other ends of such connecting ducts being severally secured to the ends of the rotor body passages 47. Although the ducts 59 are shown in Figs. 7 and 8 as rectangular in cross-section, it will be understood that the cross-sectional shape of such ducts will be so chosen as to be suitable for joining the ends of passages 47 with the cylinder 57, and to pass between the coil ends of the rotor winding.

The construction described immediately above minimizes the harmful effects of Coriolis' forces which would otherwise produce eddies and whirls impeding the flow of liquid through the casings fixed on the rotor and through the connecting ducts between such casings and the passages through the rotor body. An understanding of such forces can be obtained by considering the frow through the rotor passages and ducts. Assuming ducts 59 to be other than round and connected between the chambers and passage 47 to form a sharp 90° angle, then as the liquid flows radially outward in the rotor ducts 59 (if the entering liquid volume distribution in the longitudinal passages 47 is uniform), the relative radial velocity in the radial ducts diminishes from a maximum adjacent the inner end of the longitudinal passage 47 to zero at the outer end of the radial passage 59. The Coriolis acceleration is $2\omega V$ in which $\omega$ is the angular velocity of the rotor ($2\pi$ revolutions per second) and $V$ is the relative velocity in the radial duct. With decreasing $V$, the tangential Coriolis' acceleration varies as the radial position of the liquid varies. The forces per unit of volume of liquid due to this acceleration are then $2\omega Vd$ in which $d$ is the mass density of the liquid. In the ducts 59 and just before entrance to the passages 47, the differences between the forces will produce a whirl, with respect to the rotor, which will restrict flow into the passages 47. At the other end of the rotor and with the same construction as above described, the conditions are similar but the direction of the whirl will be in the opposite sense.

Although applicant has experimentally determined that bent connecting ducts, circular in section avoid the production of Coriolis' forces hindering the flow of liquid through such ducts, good flow conditions will also be obtained with rectangular section ducts such as shown in Figs. 6, 7, 8, 9, 10, 13 and 15, if the ducts are provided with curved vanes 63 (see Fig. 9) so placed as to divide the cross-sectional areas of the ducts into a plurality of paths of reduced cross-section. Such vanes afford means for increasing the volume of flow considerably for a given pressure drop, and the vanes are effective at both the inflow and outflow ends of the rotor passages 47.

The connecting ducts 64 in Fig. 10 distinguish from the ducts above described by formation with a modified inlet end 65, which may simplify manufacture, particularly if end 65 is circular in section.

For reasons of construction, it may be desirable to form the connecting ducts from flat sheets 70, 71 and 72 as shown in Figs. 11, 12 and 13. In Figs. 11 and 12 a substantially radial partition 73 is placed in each of the ducts 59 and substantially centrally of such ducts to divide the area thereof into two parts. Such division should minimize the harmful effects of the Coriolis' forces and is more readily manufactured than the structure shown in Figs. 9 and 10. In place of such radial partitions, the vanes 63 may be applied to the composite plate ducts as shown in Fig. 13 in which the vanes 63 are readily applicable during manufacture.

If the plate 70 is set at an angle as shown in Fig. 14, the vanes 63 may be omitted, particularly if the portions 75 of the rotor body are cut away to avoid right angle corners extending into the connecting ducts. Placing of plate 70 as shown should secure uniform radial velocity $V$, with respect to the rotor, thereby making the Coriolis' forces constant throughout the radial depth of passage 47 and thus eliminating the whirl and eddies caused thereby. Another structure is obtained if the ends of the rotor body are grooved as shown at 79 in Fig. 15 to connect passages 47 and a compartment of casing 56, 57 and 58, and are then formed with the corners cut away as at 75. The vanes 63 are then attached to the rotor body and a single plate 80 may be used to cover all of the grooves 79. Cylinder 57 which forms a part of the casing 56, 57 and 58 is then attached to plates 56 and 80.

It will be understood that constructions other than those shown in Figs. 6 to 15, inclusive, may be employed to obtain the same hydraulic results as are obtained in structures shown in the above figures. For example, use might be made of plates with holes drilled therein to take the place of the casing and connecting ducts, now employed. The junctions of holes meeting at right angles in such plates will then preferably be rounded and the plates will of course be suitably welded at the joints.

It will thus be seen that the present construction provides a stator in which heat from the embedded parts of the windings and the heat generated in the tooth-slot zone of the core, is transmitted to a plurality of cooling liquid conduits which abstract heat from a plurality of locations. The laminations are mounted in spaced packs and the conduits in each of such spaces are so connected in a group as to secure substantially uniform distribution of liquid flow in each group of ducts. The arrangement of conduits is such that, at least with the spiralling thereof in Fig. 3, the conduits alone resist the axial pressure on the laminations. The conduits provide a plurality of paths extending generally radially through the laminations for the circulation of a cooling liquid therethrough.

The present rotor construction provides particularly simple means by which the flow reducing effects of the Coriolis' forces may be avoided. The casings fixed on the rotor provide compartments connecting the radial shaft passages with the axial rotor body passages, the partitions therein affording means to prevent harmful effects which might arise from Coriolis' forces in the casings. The connecting ducts themselves provide curved flow paths and the vanes mounted therein further aid in securing unhampered liquid flow through the ducts. Other means of avoiding harmful Coriolis' forces in the connecting ducts without use of guide vanes are also shown.

Because the temperatures of both the windings and the steel are kept nearly uniform at all points and reasonably low, there will be no damage due to differential expansion and contraction. Due to the fact that more ampere turns are obtainable for a given temperature rise, and the fact that the material is better utilized, smaller and cheaper machines may be built for a given rating.

Although a number of embodiments of the present invention have been illustrated and described, it will be apparent to those skilled in the art that various changes and modifications may be made therein without departing from the spirit of the invention or from the scope of the appended claims.

I claim:

1. In a dynamoelectric machine, a rotor comprising a body portion and shaft portions extending therefrom, the rotor body having slots axially therein and passages extending through the body adjacent to the slots, windings mounted in the slots, the shaft portions having passages longitudinally therethrough and passages extending radially from the longitudinal passages, a plurality of means severally mounted about the rotor shaft portions at the ends of the radial passages therethrough to form chambers, and ducts connecting the several chambers with the rotor body passages and provided with interior partitions dividing substantially the length of the ducts into a number of separate passages.

2. In a dynamoelectric machine, a rotor comprising a rotor body portion and rotor shaft portions extending therefrom, the rotor body having slots axially therein and passages extending through the body adjacent to the slots, windings mounted in the slots, the rotor shaft portions having passages longitudinally therethrough and passages extending radially from the longitudinal passages, means mounted about the rotor shaft portions and forming compartments at the ends of the radial passages, ducts severally connecting one of the compartments with one of a number of the rotor body passages and providing substantially curved paths for the flow of cooling liquid between the compartments and the rotor body passages, and curved vanes mounted in the ducts for dividing the cross-sectional areas thereof into a plurality of curved paths for the flow of cooling liquid between the compartments and the rotor body passages.

3. In a dynamoelectric machine, a rotor comprising a rotor body portion and shaft portions extending therefrom, the rotor body having slots axially therein and passages extending through the body, windings mounted in the slots, the rotor shaft portions having co-axial passages therethrough and passages extending radially from the co-axial passages therein, means mounted about the rotor shaft portions and forming compartments adjacent to the body ends of the radial passages, ducts severally connecting one of the compartments with a number of the rotor body passages and providing substantially curving paths for the flow of cooling liquid between the compartments and the passages, curved vanes mounted in the ducts and dividing the cross-sectional areas thereof into a plurality of paths of different radii and of different lengths for facilitating flow of cooling liquid through the ducts.

4. In a dynamoelectric machine, a rotor comprising a body portion and shaft portions extending therefrom, the rotor body having slots axially therein and passages extending through the body adjacent to the slots, the passages having beveled surfaces at the ends thereof, windings mounted in the slots, the shaft portions having passages longitudinally therethrough and passages extending radially from the longitudinal passages, casings formed about the rotor shaft portions for connecting the radial shaft passages with the rotor body passages, and ducts severally including a plate at an acute angle with the end of the rotor body for connecting the casings with the rotor body passages.

5. In a dynamoelectric machine, a rotor comprising a body portion and shaft portions extending therefrom, the rotor body having slots axially therein and passages extending through the body adjacent to the slots, the rotor shaft portions having passages longitudinally therethrough and passages extending radially from the longitudinal passages, windings mounted in the slots, a plurality of means severally mounted about the rotor shaft portions at the ends of the radial passages therethrough to form chambers, and ducts connecting the several chambers with the rotor body passages and severally provided with an interior partition in a plane which if extended includes the axis of the rotor for dividing the ducts into passages of substantially equal areas.

6. In a dynamoelectric machine, a rotor comprising a body portion and shaft portions extending therefrom, the rotor body having slots axially therein and passages extending through the body adjacent to the slots and having grooves connected with the passages, the rotor shaft portions having passages longitudinally therethrough and passages extending radially from the longitudinal passages, windings mounted in the slots, a plurality of means severally mounted about the rotor shaft portions at the ends of the radial passages therethrough to form chambers, and plates joined with the means for co-action therewith in covering the grooves and forming passages connecting the means with the rotor body passages.

7. In a dynamoelectric machine, a rotor comprising a body portion and shaft portions extending therefrom, the rotor body having axial slots from the periphery thereof and co-axial passages through the body adjacent the slots, the shaft portions having axial passages therethrough and radial passages joined with the axial passages, windings mounted in the slots and extending from the body portion over the shaft portions, casings severally mounted on the shaft portions over the ends of the radial passages therein and at the body portion ends, the casings having partitions severally dividing the casings into a plurality of chambers, and ducts severally having a portion of substantially circular cross-section bent on an arc of a circle for severally connecting the casing chambers with a passage in the rotor body for conducting flow of cooling liquid between the rotor shaft passages.

8. In a dynamoelectric machine, a rotor comprising a body portion and shaft portions extending therefrom, the rotor body having axial slots from the periphery thereof and co-axial passages through the body adjacent the slots, the shaft portions having axial passages therethrough and radial passages joined with the axial passages, windings mounted in the slots and extending from the body portion over the shaft portions, casings severally mounted on the shaft portions over the ends of the radial passages therein and at the body portion ends, the casings having partitions severally dividing the casings into a plurality of chambers, the rotor body ends having grooves therein extending from the rotor shaft peripheries to join severally with the passages through the rotor body, plates attached to the rotor body ends and the casings and covering the grooves for thereby forming ducts for conducting cooling fluid from a casing chamber at one end of the rotor body to one of the coaxial passages through the rotor body passages, and curved vanes mounted in a portion of the grooves for dividing the area thereof into a number of curved liquid flow paths.

CARL J. FECHHEIMER.

REFERENCES CITED

The following references are of record in the file of this patent:

UNITED STATES PATENTS

| Number | Name | Date |
| --- | --- | --- |
| 798,156 | Bidwell | Aug. 29, 1905 |
| 1,384,865 | Shepherd | July 19, 1921 |
| 1,793,434 | Blathy | Feb. 17, 1931 |
| 1,906,849 | Fleischman | May 21, 1933 |
| 2,413,525 | Smith | Dec. 31, 1946 |

FOREIGN PATENTS

| Number | Country | Date |
| --- | --- | --- |
| 109,932 | Austria | June 11, 1928 |
| 109,294 | Great Britain | Sept. 5, 1917 |
| 497,492 | Great Britain | Dec. 21, 1938 |